Patented June 15, 1954

2,681,342

UNITED STATES PATENT OFFICE 2,681,342

QUATERNARY AMMONIUM COMPOUNDS AND METHODS FOR THEIR PRODUCTION

David M. Musser, East Orange, N. J., assignor to Onyx Oil & Chemical Company, Jersey City, N. J., a corporation of Delaware No Drawing. Application October 15, 1949, Serial No. 121,633

8 Claims. (Cl. 260—297)

This invention relates to new methods for the preparation of quaternary ammonium ethers, in particular alkoxy alkylene pyridinium chlorides, as well as the new compounds produced thereby.

It is an object of this invention to devise a new and improved process for the preparation of quaternary ammonium compounds having an alkoxy alkylene group as an N-substituent, while avoiding the disadvantages of using chloromethyl ether or its homologues at any stage in the reaction. A further object is to prepare alkoxy methylene picolinium chlorides, alkoxy methylene dialkyl benzyl ammonium chlorides and related compounds by a simple and economical method. A still further object is to prepare new and useful mixtures of pentavalent nitrogen compounds having many uses in the industrial arts. Additional objects will become apparent from a consideration of the following description and claims.

The foregoing and other objects are attained in accordance with my invention wherein I neutralize a tertiary amine with concentrated hydrochloric acid, evaporate the water from the resulting solution to obtain a substantially anhydrous hydrochloride salt of the tertiary amine, and react this product with a lower aliphatic alcohol and paraformaldehyde to produce the desired quaternary ammonium chloride. By employing anhydrous hydrogen chloride in the foregoing reaction, the evaporation step may be omitted. The ultimate products may be separated from the by-products and reactants associated therewith by distillation or other suitable treatment. As is evident from the foregoing, this method is applicable to a substantial group of tertiary amines, lower aliphatic alcohols and paraformaldehyde or related aldehydes. This will become evident as the description proceeds hereinafter.

The conditions of reaction may be varied within relatively wide limits, and it should be understood that the invention is not confined to those conditions hereinafter described in the illustrative examples. For optimum results with a large number of reactants, I have found that the pH of the anhydrous salt-alcohol-paraformaldehyde solution should advisably be 3 or lower, and as a general rule, I prefer to maintain it within the range of 2 to 3. In the same manner, I have found that reaction temperatures within the range of 25° C. to 60° C. are generally desirable for maximum yield.

This invention may be more readily understood by a consideration of the following illustrative examples wherein the quantities are stated in parts by weight, unless otherwise noted.

Example 1

To 4,219 parts of refined beta-gamma picoline was added with stirring 4,672 parts of concentrated hydrochloric acid, sp. gr. 1.188, at a rate such that the temperature of the mixture did not exceed 100° C. The mixture was decolorized with carbon and then heated up to 200° C. to drive off all the water and obtain substantially an anhydrous salt. After the salt had cooled to room temperature, 1,452 parts of methanol was introduced. The pH of a 1% solution was 4.0. This value was adjusted to 2.6 by addition of 95 parts of concentrated hydrochloric acid. Then 1,360 parts of paraformaldehyde was added. The reaction temperature was maintained at 50° C. until the product dissolved perfectly clear in water, which required about 4 hours. Unreacted methanol, together with the methylal which formed as a by-product, were removed through distillation. The yield of final product was 7,794 parts.

The final products (a mixture containing methoxy methylene beta-gamma-picolinium chloride) produced as aforesaid are characterized by being semi-solid at room temperature (crystalline material admixed with liquid). At about 50° C. they completely liquefy to form a light-amber-colored, water-clear liquid. They are completely soluble in water in all proportions.

Example 2

To 158 parts of pyridine, there was added 204.5 parts concentrated hydrochloric acid (36%) gradually and with stirring. The mixture was heated up to about 200° C. to drive off all the water and unreacted pyridine. To the cooled pyridinium hydrochloride was added 74 parts methanol. The solution was adjusted to pH 2.4. Then 55 parts of paraformaldehyde was introduced. The mixture was stirred at room temperature for 4 hours, then heated to distill off methylal and unreacted methanol. The yield was 273 parts.

The final products (a mixture containing methoxy methylene pyridinium chloride) produced as aforesaid has the same general appearance and properties as the mixture described in Example 1.

Example 3

186 parts of mixed picolines and 64 parts of methanol were treated with anhydrous hydrogen chloride at such a rate that the temperature of reaction did not exceed 70° C. until a total of 71 parts of gas had been introduced. The time required was approximately three hours. The pH of a one per cent solution was 2.1. The mixture was then allowed to cool to 40° C. when 60 parts of para-formaldehyde was introduced. The reaction mixture was mechanically stirred at 40 to 50° C. until the solution dissolved completely in water.

*Example 4*

To 135 parts of benzyl dimethyl amine was added gradually 102.2 parts of concentrated hydrochloric acid (36%). The solution was heated under slight vacuum to remove 55 parts as distillate. To the concentrated salt solution, there was then added 32 parts of methanol. Heating was required to effect complete solution. The pH of a one per cent solution was 2.2. Then at about 60° C., 30 parts of para-formaldehyde was introduced with stirring. The solution became clear in about one hour.

Excellent yields may also be obtained by repeating the above examples with other tertiary amines, such as ethyl methyl benzyl amine, diethyl benzyl amine, methyl propyl benzyl amine, methyl benzyl dimethyl amine, dimethyl benzyl amine, dimethyl pyridine, ethyl pyridine, trimethyl pyridine, ethylmethyl pyridine, propyl pyridine, tetramethyl pyridine, ethyl dimethyl pyridine, quinoline and isoquinoline. In the same manner, by substituting other lower aliphatic alcohols for methanol, the corresponding alkoxy derivatives of the desired quaternary ammonium compounds may be obtained. Among the lower alcohols suitable for this purpose may be mentioned ethyl alcohol, propyl alcohol, and isopropyl alcohol. By employing a solvent for the reactants higher alcohols than the foregoing may be used with good results, such as butyl and isobutyl alcohol, amyl alcohol, etc.

While para-formaldehyde is preferred for the reaction, it is also contemplated that higher aldehydes such as acetaldehyde, propionaldehyde, etc., may be employed. Needless to say, if desired, mixtures of aldehydes may be used. Likewise, mixtures of lower aliphatic alcohols, as well as mixtures of various tertiary amines may be selected.

The mixtures of compounds prepared in accordance with my invention contain substantial amounts of quaternary ammonium compounds. In addition, they also contain other reactants of unknown composition, which appear to appreciably enhance their desirable properties, particularly in so far as the treatment of textile materials is concerned.

Many of the quaternary ammonium compounds described heretofore are new, and it is to be understood that this invention in part is directed to such materials per se. These compounds have a variety of uses. For example, they may be employed as intermediates in the production of other organic compounds, as surface-active agents to assist in the emulsification or suspension of various materials, as textile-treating agents such as shrink-proofing materials for rayon and related cellulosic fabrics, etc.

As many apparently widely different embodiments of this invention may be made without departing from the spirit and scope hereof, it is to be understood that the invention is not limited to the specific embodiments hereof except as defined in the appended claims.

I claim:

1. A process for preparing alkoxymethylene quaternary ammonium compounds which comprises neutralizing a tertiary amine with a member selected from the group consisting of concentrated hydrochloric acid and anhydrous hydrogen chloride, and reacting the resulting amine hydrochloride in a substantially anhydrous condition with a lower aliphatic alcohol and paraformaldehyde.

2. A process for preparing alkoxymethylene quaternary ammonium compounds which comprises reacting a tertiary amine hydrochloride in a substantially anhydrous condition with a lower aliphatic alcohol and paraformaldehyde at a pH of between about 2 and 3 and a temperature between about 25° and 60° C.

3. A process for preparing alkoxymethylene quaternary ammonium compounds which comprises neutralizing a tertiary amine with concentrated hydrochloric acid, evaporating water from the resulting solution until a substantially anhydrous hydrochloride salt of the tertiary amine is obtained, and reacting methanol and paraformaldehyde with said salt at a pH of between about 2 and 3 and a temperature between about 25° C. and 60° C.

4. The quaternary - ammonium - compound-containing product produced in accordance with the method of claim 1.

5. The quaternary - ammonium - compound-containing product produced in accordance with the method of claim 3.

6. A process for preparing alkoxymethylene quaternary ammonium compounds, which process comprises the steps of preparing a mixture of a lower aliphatic alcohol and a tertiary amine hydrochloride, which mixture when diluted to 1% concentration with water, shows a pH no higher than about 3, and reacting this mixture at 25 to 60° C. with a lower aliphatic aldehyde.

7. The process of claim 1, wherein the tertiary amine is an N-heterocyclic amine.

8. The process of claim 1, wherein the tertiary amine is one having a pyridine nucleus.

References Cited in the file of this patent

UNITED STATES PATENTS

| Number | Name | Date |
| --- | --- | --- |
| 2,125,901 | Evans | Aug. 9, 1938 |

OTHER REFERENCES

Bohme et al.: Liebig's Annalen, 563, 68 (1949).
Bohme et al.: Liebig's Annalen, 563, 69 (1949).